United States Patent [19]
Weaver et al.

[11] 4,146,513
[45] Mar. 27, 1979

[54] MODIFIED PHENOLIC TACKIFIER

[75] Inventors: Elsworth J. Weaver; James N. Mitchell, both of Columbus, Ohio

[73] Assignee: Ashland Oil, Inc., Ashland, Ky.

[21] Appl. No.: 841,624

[22] Filed: Oct. 13, 1977

Related U.S. Application Data

[63] Continuation-in-part of Ser. No. 669,434, Mar. 22, 1976, abandoned.

[51] Int. Cl.$^2$ .............. C08L 61/14; C08L 7/00; C08L 9/00; C08L 9/06
[52] U.S. Cl. .................................... 260/3; 260/38; 260/42.14; 260/42.22; 260/42.17; 260/841; 260/843; 260/845; 260/846; 526/6
[58] Field of Search ................. 260/845, 846, 841, 3, 260/38, 42.14, 42.22, 42.17; 526/6

[56] References Cited

U.S. PATENT DOCUMENTS

| | | | |
|---|---|---|---|
| 2,649,432 | 8/1953 | Little | 260/845 |
| 2,997,455 | 8/1961 | Broich et al. | 260/45.9 R |
| 3,001,999 | 9/1961 | Geschickter et al. | 260/247.7 Z |
| 3,173,952 | 3/1965 | Farrar | 260/274.72 |
| 3,462,382 | 8/1969 | Kolka et al. | 260/845 |
| 3,962,156 | 6/1976 | Harrop | 260/846 |

*Primary Examiner*—John C. Bleutge

[57] ABSTRACT

Tack is imparted to uncured elastomers by the inclusion of the product of the reaction between an alkylphenol-formaldehyde condensation product having methylol groups with di-2-hydroxyalkylamine or morpholine. In addition to imparting tack to the elasatomer, the tackifier of this invention does not interfere with but tends to enhance the development of adhesion of the elastomer to reinforcing fibers.

15 Claims, No Drawings

MODIFIED PHENOLIC TACKIFIER

REFERENCE TO PRIOR APPLICATION

This is a continuation-in-part of copending application Ser. No. 669,434 filed Mar. 22, 1976 now abandoned.

BACKGROUND OF THE INVENTION

During the fabrication of rubber articles, it is common for unvulcanized calendered sheets to be laminated to obtain the desired structural configuration. This technique of building up of layers of uncured elastomer is used extensively in the tire building industry, but also finds utility in the manufacture of other rubber articles such as mechanical goods and hoses. In order that the unvulcanized composites have the necessary mechanical stability toward handling and storage, the elastomeric materials must have sufficient tack so that the desired configuration is retained through the vulcanization step. This tack is the ability of unvulcanized elastomer to adhere to itself or to another elastomer which also has tack. This adhesive property, known as "building tack" plays an important role in the production of rubber goods. In the manufacture of tires, "building tack" holds the inner-liner, beads, plys, sidewalls and tread together prior to vulcanization.

Natural rubber has the advantage of having sufficient tack without tackifying resins being added. However, synthetic rubbers lack this building tack, and the use of resinous modifiers is necessary to obtain the tack required for fabrication. It is not uncommon, however, to add tackifiers to natural rubber or to blends of natural and synthetic rubber compounds to aid in tack retention during storage of calendered unvulcanized stock. Tackifiers also provide secondary benefits by reducing compound viscosity and also by functioning as plasticizers.

A number of different types of materials are utilized as rubber tackifiers. These include various hydrocarbon resins made from feestocks derived principally from petroleum cracking and coal tar operations. Aliphatic and aromatic type hydrocarbon resins are produced primarily from petroleum derived streams. While coumarone-indene resins are coal tar derived, similar resins are also made from petroleum sources. Polyterpenes, terpene phenolics, rosin and rosin derivatives, alkylphenol-aldehyde resins, alkylphenol acetylene resins, natural rubber and reclaimed rubber are also utilized as rubber tackifiers.

The hydrocarbon resins are in general less expensive than are the phenolics, but require the use of up to three times the amount to give equivalent tack with tack retention being adversely affected. Since tackifiers which remain in the fabricated rubber article can tend to detract from the properties of the rubber, phenolics are often advantageously used because of the lower level required. However, phenolic tackifiers do tend to decrease the adhesion of the rubber to wire or other reinforcing fibers. For this reason, hydrocarbon resins are sometimes used, even though higher percentages are required, when adhesion of the rubber to reinforcing materials is critical. This invention provides phenolic tackifiers having desirable efficiency with no adverse effect on the adhesion of the rubber to the reinforcing element.

SUMMARY OF THE INVENTION

This invention concerns a tackifier for unvulcanized elastomers comprising an alkylphenol-formaldehyde condensation product having aminomethylene groups on the phenolic ring. These compounds are prepared by the reaction of the corresponding alkylphenol-formaldehyde resin containing terminal methylol groups with di-2-hydroxyalkylamine or morpholine, or by the reaction of an alkylphenol-formaldehye novolac with di-2-hydroxyalkylamine or morpholine in the presence of formaldehyde, or by the reaction of an alkylphenol with formaldehyde and morpholine or di-2-hydroxyalkylamine.

These compounds can also be prepared by the reaction of the corresponding alkylphenol-formaldehyde product with N-methylolmorpholine.

DESCRIPTION OF THE PREFERRED EMBODIMENTS

Phenol-formaldehyde resins normally used for imparting tack to elastomers are of the oil soluble, non-heat reactive type, prepared by the acid catalyzed reaction of a para-substituted alkyl phenol with formaldehyde. The structure of such a polymer is believed to approximate that shown in formula I.

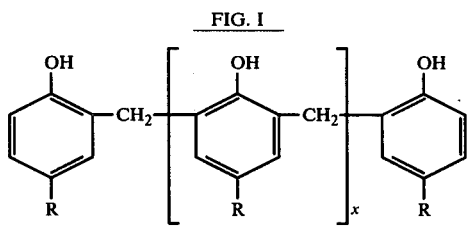

FIG. I

The compatibility of the resin is dramatically affected by the molecular weight (value of X) and by the R group in the para-position. These nonreactive polymers remain relatively unchanged at vulcanization temperatures.

Heat reactive alkylphenol-formaldehyde resins, on the other hand, tend to polymerize further and can lead to agglomerations of brittle thermoset polymers, resulting in a stiffening of the rubber with accompanying disadvantageous effect on modulus and tensile strength. These heat reactive polymers have structures approximately shown in formula II.

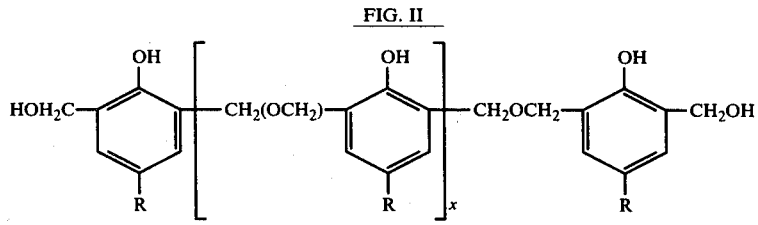

FIG. II

We have found that the polymers of formula II, or the polymers of formula I when heated with additional formaldehyde to form terminal methylol groups, can be converted to aminomethylene derivatives by reaction with either morpholine or di-2-hydroxyalkylamines. Formula III shows the reaction sequence starting with the alkylphenolic polymer of formula I. Formula IV shows the reaction sequence starting with the alkylphenolic polymer of formula II.

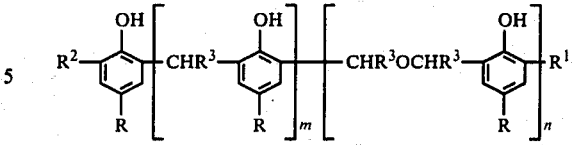

FIG. III

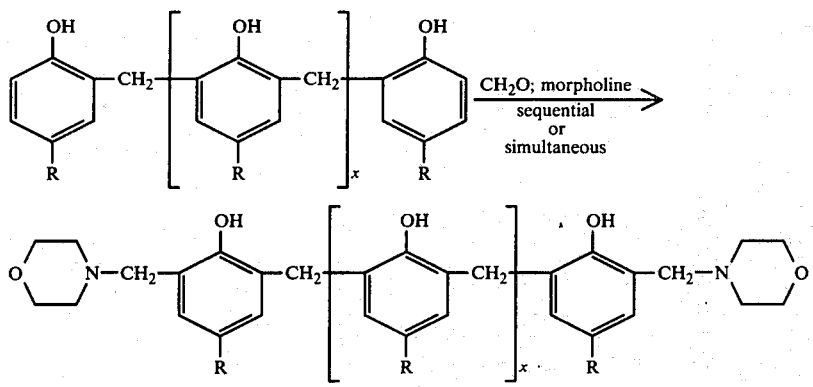

FIG. IV

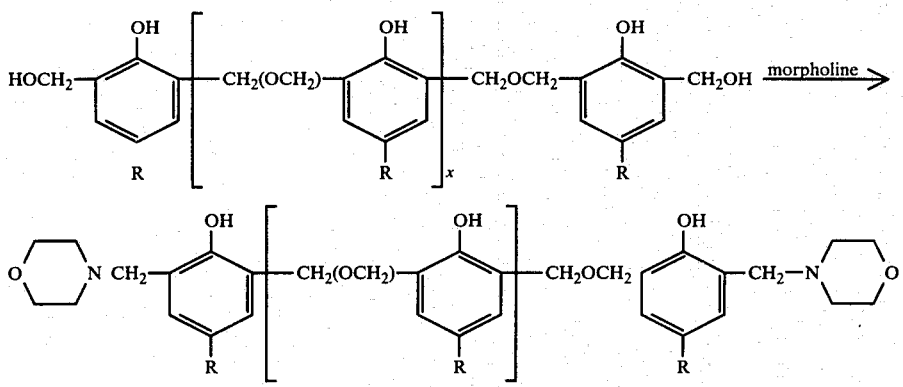

The reaction of primary and secondary amines with formaldehyde and active hydrogen compounds (the Mannich reaction) has been widely studied (Organic Reactions, Wiley, Vol. 1, Chap. 10, p. 303). This invention is concerned with the Mannich reaction only as it applies to phenols, (specifically to p-alkyl phenols) and morpholine or di-2-hydroxyalkylamines. U.S. Pat. Nos. 2,040,039 and 2,040,040 disclose the ease of the condensation of alkylated phenol, formaldehyde and morpholine to form the corresponding morpholinomethylenephenols. U.S. Pat. No. 3,001,999 discloses the reaction of p-alkylphenol with formaldehyde and amines, including morpholine. U.S. Pat. Nos. 3,173,952 and 2,997,445 discloses the aminoalkylation of dialkylphenols; German Patent No. 2,320,526 discloses aminoalkylation using diethanolamine.

We have found that aminomethylene terminated alkylphenols and polymers thereof, when the amine group is morpholine or a diethanolamine, will impart good tack properties to uncured rubber and, most importantly, provide good tack retention and also not diminish, and will usually enhance, the adhesion of the rubber to the reinforcing elements.

Tackifiers employed according to the present invention when the amine group is morpholine can be represented by the formula:

where
R is alkyl

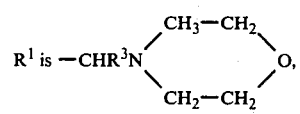

$R^2$ is $R^1$ or a mixture of $R^1$ with H or —$CHR^3OH$, or both, provided that when $R^2$ is a mixture, $R^1$ is the predominant constituent of the mixture,
$R^3$ is H or lower alkyl of 1–4 carbon atoms,
and where m plus n is at least 1.

The phenolic component for the compounds of this invention is a difunctional hydroxybenzene, having an alkyl substituent in the para position which contains 1–24 carbon atoms, preferably 4–12 carbon atoms. Phenols with additional substituents in the meta position are operable, but are not preferred. The alkylation procedure used to prepare the alkyl phenols is usually carried out under acid catalysts with equimolecular amounts of phenol and the alkylating agent, but normally a portion (2–5%) of the alkylation takes place in the ortho position without deleterious effect on the performance of the tackifier. The presence of a small amount of dialkylphenol, obtained by use of greater than stoichiometric amount of alkylating agent, has been found in some cases to lead to higher adhesion and tack values than expected. Typical alkylating agents are diisobutylene (octylphenol) tripopylene (nonylphenol) and tetrapropylene (dedecylphenol). The amines used to prepare the tackifier resin of this invention are morpholine and amines which can be dehydrated to morpholine, such as diethanolamine and di-2-hydroxy propylamine.

The molar ratio alkylphenol formaldehyde/amine can vary widely. At one end of the spectrum would be 2,6-diaminomethylene-4-alkylphenol with a molar ratio of 1/2/2. At the other extreme would be a ratio of alkylphenol/formaldehyde/amine of 20/28/2. The ratio selected depends, among other factors, on (1) the physical properties of the resin which are desired for easiest handling of the resin and the tackified rubber (2) the melting point desired and (3) the cost limitations. Thus, although fluid compositions are effective, we have found that preferred tackifiers have softening points between 85° and 135° C., and most preferably between 95° and 120° C. The reaction conditions for the phenol-formaldehyde condensation will also affect the ratio, since basic conditions will tend to increase the amount of benzylic ether linkages, thus increasing the formaldehyde required. This invention includes all these p-alkylphenol-formaldehyde condensation products having terminal morpholinomethylene groups, when such materials are used to improve tack of uncured rubber and to maintain the adhesive strength of the rubber-reinforced fiber bond.

A typical rubber composition employing a tackifying compound of the type used according to the present invention includes brass coated steel, polyester or poly aromatic amide reinforcing fibers and the vulcanization product of uncured natural or synthetic rubber or their mixtures, extender oil, carbon black, curative agents and from 2-5 parts per hundred parts of rubber of a tackifying compound of the type employed according to the present invention.

Table I shows the various resins prepared and evaluated. Examples 1 through 4 are standard types of tackifiers commercially available. Examples 5-7 have been modified with polyamines, giving resins which have not shown significant improvement in adhesion, and are deleterious to tack retention. Examples 8-14 show the preparation of compounds of this invention, based on morpholine and diethanolamine. The procedures A-E listed in Table I are as follows:

Procedure A. The phenolic component and formaldehyde (50% aqueous) and acid catalyst were charged simultaneously to a reaction vessel and reacted at 100° C. After the prescribed reaction time, the product was vacuum dehydrated to the desired softening point.

Procedure B. The phenolic component, acid catalyst and azeotroping solvent were heated at least to the boiling point of the solvent, and aqueous formaldehyde was added incrementally while continually azeotropically removing water. Solvent was removed by vacuum distillation when the condensation was complete.

Procedure C. The phenolic component in an azeotroping solvent was heated until the phenolic component dissolved. The amine component was added slowly so that the exotherm of dissolution did not cause the temperature to exceed 130° C. In those cases (Examples 8-11, 13, 14) where the amine was morpholine, 2-10% of triethylamine (TEA) catalyst (based on morpholine and phenol) was used. The formaldehyde (50% aqueous) was then added either as one charge (Examples 1, 3, 8, 10, 13, 14) or intermittantly (Examples 2, 5, 7, 11, 12, 15). When added as one charge, the reaction was run at full reflux, and the solvent and water were removed at the completion of the reaction by vacuum distillation. When added incrementally, the water was continually removed azeotropically over the time of formaldehyde addition.

Procedure D. Resin of Example 2 (octyl phenol novolac) was dissolved in sufficient toluene to make an 80% solids solution, heated to 110° C., and the secondary amine was added in one charge (TEA catalyst was added when morpholine was used). The temperature was raised to 120° C., and formaldehyde was added incrementally while continually azeotroping the water. The solvent was then removed by vacuum distillation.

Procedure E. Dimethylol octylphenol was prepared by the base(lithium hydroxide 93% and TEA 4%) catalyzed condensation of octylphenol (1 mole) with 50% aqueous formaldehyde (2 moles). The dimethyloloctylphenol product was dissolved in toluene/benzene at 65% solids. Morpholine was added in one charge, and the reaction mass was refluxed to completion and vacuum dehydrated to the desired softening point and methylol content of less than 1%. This value for methylol content includes methylol groups and benzylic ether bridges.

Table I

| Example | Procedure | R[8] | Overall Mole Ratio phenolic/CH$_2$O amine | Amine | Time for CH$_2$O Addition | Catalyst Level TEA | Softening Point[9] |
|---|---|---|---|---|---|---|---|
| 1. | A | octyl[1] | 1/0.9/0 | — | — | | 85-105° C. |
| 2. | B | octyl | 1/0.95/0 | — | 4 hrs. | | 110-130° C. |
| 3. | B | dodecyl[2] | 1/1.25/0 | — | 5 hrs. | | 95-115° C. |
| 4. | Resin of Example 1 plus 25% pentaerythritol ester of rosin acids | | | | | | |
| 5. | C | t-butyl | 1/1.15/0.25 | TETA | 3 hrs. | | 113.5° C. |
| 6. | C | nonyl | 1/1.35/0.25 | TETA | 3 hrs. | | 106° C. |
| 7. | C | t-butyl[3] | 1/2.3/0.5 | EDA[5] | 3 hrs. | | 99° C. |
| 8. | C | H | 1/3.5/1 | Morpholine | — | 5% | 96° C. |
| 9. | C | t-butyl | 1/3.2/1 | Morpholine | — | 10% | paste |
| 10. | C | octyl[6] | 1/2.3/1.1 | Morpholine | — | 9% | liquid |
| 11. | D | octyl | 1/1.2/0.23 | Morpholine | 20 min. | 3% | 104° C. |
| 12. | D | octyl | 1/1.2/0.23 | DEA[7] | 25 min. | — | 151° C. |
| 13. | E | octyl | 1/2/0.66 | Morpholine | — | 4 | 93° C. |
| 14. | E | octyl[6] | 1/1.7/0.67 | Morpholine | — | 4 | 82° C. |

Table I-continued

| Example | Procedure | R[8] | Overall Mole Ratio phenolic/CH$_2$O amine | Amine | Time for CH$_2$O Addition | Catalyst Level TEA | Softening Point[9] |
|---------|-----------|------|-------------------------------------------|-------|---------------------------|--------------------|---------------------|
| 15.     | C         | octyl| 1/2/2                                     | Morpholine | 100 min.             | 4%                 | liquid              |

[1] From the alkylation of phenol with diisobutylene
[2] From the alkylation of phenol with tetapropylene
[3] From the alkylation of phenol with tripropylene
[4] Triethylene tetramine
[5] Ethylenediamine
[6] The phenolic was prepared by alkylation of phenol with diisobutylene at a molar ratio of olefin to phenol of 1.5/1. Therefore, some of the active positions have been substituted with alkyl groups.
[7] diethanolamine
[8] R is the para alkyl group on the phenol
[9] ASTM Ring and Ball Softening Point E 28-67

The recipe for the rubber stock used in these evaluations was as follows:

1RSS — 40 parts — #1 Ribbed smoked sheets, a grade of natural rubber (described in Vanderbilt's Rubber Handbook, 1968 Edition) which must be dry, clean, free from blemishes, resinous material, sand, dirty packing or other foreign material. Ribbed smoked sheets comprise coagulated rubber sheets properly dried and smoked and cannot contain cuttings, scrap, frothy sheets, weak, heated, or burnt sheets. Air dried or smooth sheets are not permissable.

SBR 1502 — 40 parts — A standard styrene-butadiene rubber containing 23.5% bound styrene and nominal Mooney Viscosity (ML 1 + 4) at 212° F. of 52. It is non-staining and is prepared using fatty acid-rosin acid type emulsifier and is a standard, cold-polymerized, non-pigmented SBR.

Cis-1,4-Polybutadiene — 20 parts — Butadiene homopolymer of high Cis-1,4-content. Budene 501, (Goodyear) is a non-staining, solution polymerized gum with Mooney Viscosity (ML 1 + 4) at 212° F. of 45-55. Cis content is approximately 93%.

N 660 — 45 parts per hundred resin (PHR) — GPF (General Purpose Furnace) — A carcass grade carbon black with particle diameter about 62 nanometers, DPB absorption 0.91 cm$^3$/g., ASTM iodine No. 36, and bulk density 26 lb/ft$^3$.

Circo Light 9 PHR — RPO (Rubber Process Oil) — Similar to ASTM #3 oil, a napthenic type oil with SUS viscosity 156 at 100° F., specific gravity 0.922 at 60° F., mol. wt. about 330, and anilene point 157° F. Viscosity index intermediate between paraffinic and aromatic oils, manufactured by Sun Oil Co.

Santoflex 13 — 1.9 PHR — An antiozonant manufactured by Monsanto.

Insoluble Sulfur 60 — 2.75 PHR — Vulcanizing agent manufactured by Monsanto.

Santocure — 0.9 PHR — Delayed action accelerator; Monsanto

Santogard PVI— 0.25 PHR — Pre-vulcanization Inhibitor; Monsanto

Tackifier 3 PHR — The control in Tables II-IV does not contain any tackifier resin.

Rubber Compounding — The rubber compound was made in two steps. Step one involved mixing all ingredients except the curatives (sulfur, Santocure and Santogard PVI) in a Banbury mixer for a total of 5-6 minutes at 330° F. The curatives were added in step 2 and the mass was mixed for an additional 2-3 minutes at 220° F.

Tack Test — The rubber compound was milled to a thickness of 60 mil, and placed on Holland cloth. The exposed side was covered with polyester fabric. The composite was pressed at 200° F. and 75 psi for 2 minutes to remove surface irregularities and to force the polyester reinforcement into the rubber stock. Two 0.75 × 2.0 inch strips were stripped of the Holland cloth, and pressed together. The tack was determined using a Monsanto Tel-tak instrument with a 30 second dwell time and a 16 oz. weight on the sample. Additional samples were held for 72 hours at high humidity, and the tack of these humid-aged samples was determined. The tack values shown in Table II include tack and also the percent tack retention after humid aging (i.e., Example 1 shows 37.5 ± psi at separation with 120% tack retention after humid aging). The separate series (I–V are individual testing programs, and the values should be compared with the value for the control (rubber compound without tackifier) in each series.

Table II

| Example # | Tack Evaluation[1] | | Series |
|-----------|--------------------|---|--------|
|           | | Control | |
| 1         | 37.5±1.6/120 | 36 1/63 | |
| 4         | 35.2±1.4/114 | " | I |
| 2         | 36.9±1.8/120 | " | |
| 3         | 37.5±1/106 | " | |
| 8         | 39±2.1/47 | 39.6±2.2/36 | |
| 9         | 37.6±1.6/48 | " | II |
| 1         | 40.7±2.3/82 | 39.1±2.5/73 | |
| 10        | 39±1/89 | " | III |
| 11        | 36.5±2.1/88 | " | |
| 12        | 38±1/69 | " | |
| 1         | 27.4±1.5/105 | 30.7±1.5/59 | |
| 13        | 27.1±1.2/103 | " | IV |
| 14        | 23.2±1.5/112 | " | |
| 1         | 30±5 1.8/106 | 28.4±1/25 | |
| 10        | 27±1.8/53 | " | V |
| 11        | 28.5±1.1/107 | " | |

Humid aging conditions for determining tack retention
Series I - 72 hrs. at 80° F. and 70% RH
Series II - 72 hrs. at 80° F. and 70% RH
Series III - 72 hrs. at 70° F. and 50% RH
Series IV - 72 hrs. at 70° F. and 50% RH
Series V - 72 hrs. at 85° F. 90-95% RH Static Adhesion — Table II shows the data obtained by testing the rubber stock without tackifier (Control) and with the various tackifying resins, according to ASTM D 2229-73, Adhesion of Vulcanized Rubber to Steel Cord. The steel cord used was National Standard 6-3 wire (brass coated steel). Cure time was $T_o^1(90)+$ six minutes mold factor time. Embedment length of wire in the block was 0.75 inches. Table II gives the values, for series I-VI, for both adhesion and coverage (i.e., Example 1, 31±7 pounds required to extract wire, with 10% coverage). Coverage was determined by visual examination of the pulled wire.

Table III

| Example # | Static Adhesion Evaluation (ASTM2229) | | Series |
|---|---|---|---|
| | | Control | |
| 1 | 31 ±7/10 | 93±11/80 | I |
| 5 | 26±5/<5 | " | |
| 6 | 26±3/<5 | " | |
| 1 | 59.9±8.6/50 | 84.6±8.2/80 | II |
| 4 | 71.5±8.4/50 | " | |
| 2 | 50.9±10/50 | " | |
| 3 | 50±7.6/30 | " | |
| 1 | 34±3.4/10 | 98.9±5.9/70 | |
| 7 | 51.7±7.1/30 | " | |
| 8 | 118.1±14.8/90 | 126.5±14.1/90 | III |
| 9 | 145.9±15.1/90 | " | |
| 10 | 138.3±15.1/80 | 127.8±13.8/70 | IV |
| 11 | 103±8.9/80 | " | |
| 12 | 103.2±7.4/80 | " | |
| 13 | 158.5±16/100 | " | V |
| 14 | 142.3±7.4/100 | " | |
| 1 | 121.2±11.4/80 | 156.6±12.3/90 | VI |
| 10 | 174.9±11.5/95 | " | |
| 11 | 183.6±12.4/100 | " | |

Table II shows conclusively that the compounds of this invention (Example 8–14) develop the same degree of tack as do conventional, commercially acceptable phenolic tackifiers (Examples 1–4).

Table III shows dramatically the surprising increase in static adhesion which is observed using the compounds of this invention when compared to conventional phenolic tackifiers. Examples 5-7, which are aminoethylene substituted phenolics using other than di- 2-alkanolamines or morpholine as the amine do not give the superior results which are obtained by use of morpholine or di-2 -hydroxyalkylamines.

What is claimed is:

1. A method for improving tack and tack retention in uncured, vulcanizable elastomers while maintaining acceptable adhesion of the cured elastomer or reinforcing elements, comprising dispersing in said elastomer a tackifying compound of the structure

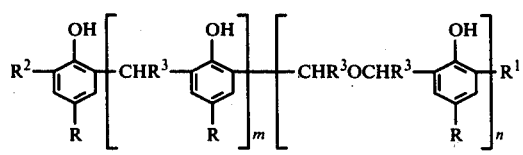

where
R is alkyl

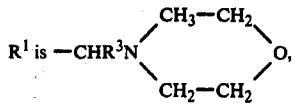

$R^2$ is $R^1$ or a mixture of $R^1$ with H or —$CHR^3OH$, or both provided that when $R^2$ is a mixture, $R^1$ is the predominant constituent of said mixture, $R^3$ is H or lower alkyl of 1–4 carbon atoms, and where m plus n is at least 1.

2. The method of claim 1 wherein R is an alkyl group of 4–12 carbon atoms, and wherein $R^3$ is hydrogen.

3. The method of claim 2 wherein R is octyl.

4. The method of claim 3 wherein the tackifying compound has a softening point of between about 85° C. and 135° C.

5. The method of claim 3 wherein the tackifying compound has a softening point of between about 95° and 120° C.

6. The method of claim 5 wherein the tackifying compound has a free methylol content of less than 2 weight percent.

7. A method for improving tack in uncured, vulcanizable elastomers while maintaining acceptable adhesion of the cured elastomers to reinforcing fibers comprising dispersing in said elastomers, a tackifying compound prepared by the reaction of a p-alkylphenol formaldehyde condensation product of the structure

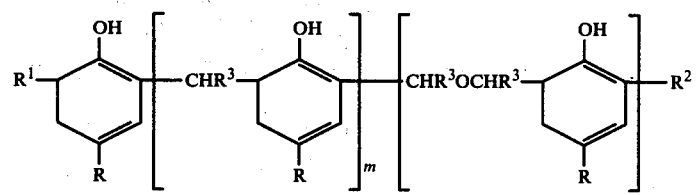

where
R is alkyl,
$R^1$ is —$CHR^3OH$,
$R^2$ is $R^1$ or a mixture of $R^1$ and H, provided that when $R^2$ is a mixture, $R^1$ is the predominant constituent of said mixture,
and where m plus n is at least 1,
with morpholine.

8. The method of claim 7 wherein R is octyl and wherein the softening point of said tackifying compound is between 90° and 120°.

9. The method of claim 8 wherein the tackifying resin contains a ratio of said p-octylphenol to formaldehyde of from 1 to 0.5 to 1-2.2, and a ratio of phenol to said morpholine of from 1-0.1 to 1-2.0.

10. A method for improving tack in uncured, vulcanizable elastomers while maintaining acceptable adhesion of the cured elastomer to reinforcing fibers comprising dispersing in said elastomers a tackifying compound prepared by the reaction of p-alkylphenol-formaldehyde condensation product of structure

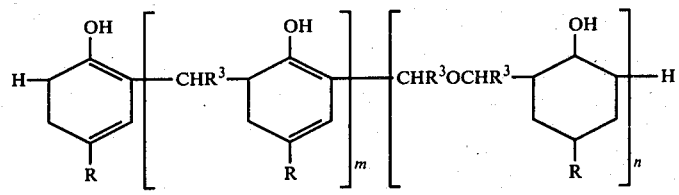

where
R is alkyl,
R³ is H or lower alkyl,
and where m plus n is at least 1,
with formaldehyde and morpholine.

11. The method of claim 10 wherein the R is octyl and where the softening point of said tackifying compound is between about 95° C. and 120° C.

12. A method for improving tack in uncured vulcanizable elastomers while maintaining acceptable adhesion of the cured elastomer to reinforcing fibers comprising dispersing in said elastomers a tackifying compound prepared by the reaction of a p-alkylphenol-formaldehyde condensation product of the structure:

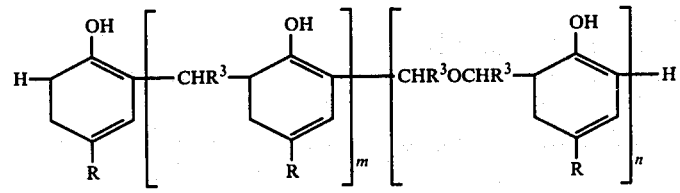

where
R is alkyl,
R³ is H or lower alkyl
with N-methylolmorpholine.

13. A vulcanized rubber composition containing brass coated steel, polyester or poly aromatic amide reinforcing fibers comprising the vulcanization product of uncured natural or synthetic rubber or their mixtures, extender oil, carbon black, curative agents and from 2–5 parts per hundred parts of rubber of a tackifying compound of the structure

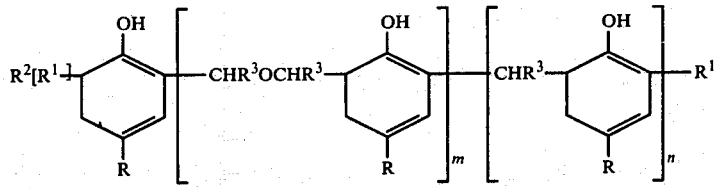

where
R is alkyl

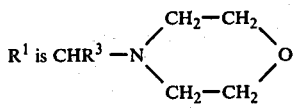

R³ is alkyl or hydrogen,
R² is R¹ or a mixture of R¹ and H or —CHR³OH, or both, provided that when R² is a mixture, R¹ is the predominant constituent of the mixture,
and where m plus n is at least 1.

14. The composition of claim 13 wherein R is octyl and where R³ is hydrogen and where said tackifying resin has a softening point of 95° C. to 120° C.

15. The composition of claim 13 wherein R is octyl and where R³ is hydrogen and where said tackifying resin is a liquid and has a viscosity at 35° C. of up to 1200 poises.

* * * * *